US 8,464,270 B2

(12) United States Patent
Little

(10) Patent No.: US 8,464,270 B2
(45) Date of Patent: Jun. 11, 2013

(54) DEPENDENCY MANAGEMENT WITH ATOMIC DECAY

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1202 days.

(21) Appl. No.: 11/998,702

(22) Filed: Nov. 29, 2007

(65) Prior Publication Data
US 2009/0144305 A1 Jun. 4, 2009

(51) Int. Cl.
G06F 9/46 (2006.01)

(52) U.S. Cl.
USPC .............................. 718/106; 719/330; 719/331

(58) Field of Classification Search
None
See application file for complete search history.

(56) References Cited

U.S. PATENT DOCUMENTS

| 6,151,608 | A  | * | 11/2000 | Abrams ........................ 707/679 |
| 6,226,792 | B1 | * | 5/2001  | Goiffon et al. ................ 717/120 |
| 6,256,675 | B1 | * | 7/2001  | Rabinovich ................... 709/241 |
| 6,622,259 | B1 | * | 9/2003  | Schmuck ...................... 714/4.21 |
| 6,810,259 | B1 | * | 10/2004 | Zhang .......................... 455/456.5 |
| 7,065,637 | B1 |   | 6/2006  | Nanja |
| 7,080,078 | B1 |   | 7/2006  | Slaughter et al. |
| 7,124,320 | B1 | * | 10/2006 | Wipfel ............................ 714/13 |
| 7,159,224 | B2 |   | 1/2007  | Sharma et al. |
| 7,185,342 | B1 |   | 2/2007  | Carrer et al. |
| 7,464,147 | B1 | * | 12/2008 | Fakhouri et al. ............. 709/223 |
| 7,627,671 | B1 | * | 12/2009 | Palma et al. .................. 709/224 |
| 7,730,172 | B1 |   | 6/2010  | Lewis |
| 7,912,945 | B2 |   | 3/2011  | Little |
| 2002/0007468 | A1 | * | 1/2002 | Kampe et al. ...................... 714/4 |
| 2002/0052884 | A1 | * | 5/2002 | Farber et al. ............... 707/104.1 |
| 2002/0091746 | A1 | * | 7/2002 | Umberger et al. ............ 709/105 |
| 2002/0107949 | A1 |   | 8/2002 | Rawson |
| 2002/0129346 | A1 | * | 9/2002 | Lee et al. ....................... 717/163 |
| 2002/0156893 | A1 | * | 10/2002 | Pouyoul et al. ............... 709/225 |
| 2002/0178254 | A1 |   | 11/2002 | Brittenham et al. |
| 2003/0009545 | A1 |   | 1/2003 | Sahai et al. |
| 2003/0018780 | A1 |   | 1/2003 | Kawashima |
| 2003/0046615 | A1 | * | 3/2003 | Stone .............................. 714/47 |
| 2003/0182427 | A1 | * | 9/2003 | Halpern ........................ 709/226 |
| 2003/0192028 | A1 | * | 10/2003 | Gusler et al. .................. 717/101 |
| 2004/0064543 | A1 | * | 4/2004 | Ashutosh et al. ............. 709/224 |
| 2004/0064548 | A1 | * | 4/2004 | Adams et al. ................. 709/224 |
| 2004/0068637 | A1 | * | 4/2004 | Nelson et al. ................. 711/203 |
| 2004/0133611 | A1 | * | 7/2004 | Cabrera et al. ............... 707/203 |
| 2004/0148185 | A1 |   | 7/2004 | Sadiq |
| 2005/0010919 | A1 | * | 1/2005 | Ramanathan et al. ........ 717/174 |
| 2005/0071470 | A1 | * | 3/2005 | O'Brien et al. ............... 709/226 |
| 2005/0119905 | A1 | * | 6/2005 | Wong et al. ....................... 705/1 |
| 2005/0120092 | A1 |   | 6/2005 | Nakano et al. |
| 2005/0172306 | A1 | * | 8/2005 | Agarwal et al. ............... 719/328 |
| 2005/0198450 | A1 | * | 9/2005 | Corrado et al. ............... 711/162 |
| 2005/0235248 | A1 | * | 10/2005 | Victoria et al. ............... 717/102 |

(Continued)

OTHER PUBLICATIONS

"JBossESB Requirements and Architecture, Version: 0.3," May 2, 2006, pp. 1-12.

(Continued)

Primary Examiner — Lechi Truong
Assistant Examiner — Shih-Wei Kraft
(74) Attorney, Agent, or Firm — Lowenstein Sandler LLP

(57) ABSTRACT

A dependency is identified between a first component of a distributed computing system and a second component of the distributed computing system if the first component invokes the second component. A dependency map of the distributed computing system that includes the dependency between the first component and the second component is built.

18 Claims, 9 Drawing Sheets

U.S. PATENT DOCUMENTS

| | | | |
|---|---|---|---|
| 2006/0005162 A1* | 1/2006 | Tseng et al. | 717/107 |
| 2006/0106590 A1* | 5/2006 | Tseng et al. | 703/20 |
| 2006/0190527 A1 | 8/2006 | Neil et al. | |
| 2006/0218266 A1 | 9/2006 | Matsumoto et al. | |
| 2006/0218272 A1 | 9/2006 | Murakami | |
| 2006/0242292 A1* | 10/2006 | Carter | 709/224 |
| 2007/0180436 A1* | 8/2007 | Travostino et al. | 717/138 |
| 2007/0233671 A1* | 10/2007 | Oztekin et al. | 707/5 |
| 2007/0240143 A1* | 10/2007 | Guminy et al. | 717/168 |
| 2007/0294577 A1* | 12/2007 | Fiske | 714/13 |
| 2008/0059746 A1* | 3/2008 | Fisher | 711/165 |
| 2008/0071748 A1* | 3/2008 | Wroblewski et al. | 707/3 |
| 2008/0263559 A1 | 10/2008 | Das et al. | |
| 2008/0300851 A1* | 12/2008 | Chakrabarti et al. | 703/22 |
| 2009/0037573 A1 | 2/2009 | Qiu et al. | |
| 2009/0141635 A1 | 6/2009 | Little | |
| 2010/0146396 A1 | 6/2010 | Able et al. | |

OTHER PUBLICATIONS

OASIS, "Web Services Context Specification (WS-Context)," OASIS Committee draft version 0.8, Version created Nov. 3, 2004, Editors, Mark Little, et al., Copyright © 2004 The Organization for the Advancement of Structured Information Standards [Appendix A], pp. 1-23.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworid.com/javaworid/jw-02-2000/jw-02-jmsxml.html, Mar. 14, 2007, pp. 1-13.

"Why ESB and SOA?" Version 0.3, Date: Jan. 27, 2006, pp. 1-7.

King, Erik, "Perpetual Enterprise Management Service (PEMS) for Next Generation SOA-based Command & Control Systems", Jun. 2005, 49 pages.

Huber et al., "Tool Supported Specification and Simulation of Distributed Systems," Institut fur Informatik, Technische Universitat Munchen, 1998, 10 pages, Munchen.

Hewlett-Packard Development Company, L.P., "HP Network Node Manager Advanced Edition 7.53 Data Sheet", Jun. 2008, 7 pages.

USPTO Office Action for U.S. Appl. No. 12/324,774 mailed Feb. 16, 2012.

USPTO Office Action for U.S. Appl. No. 12/324,774 mailed Sep. 13, 2011.

U.S. Appl. No. 12/324,774, Graphical User Interface for Managing Services in a Distributed Computing System, filed Nov. 26, 2008.

* cited by examiner

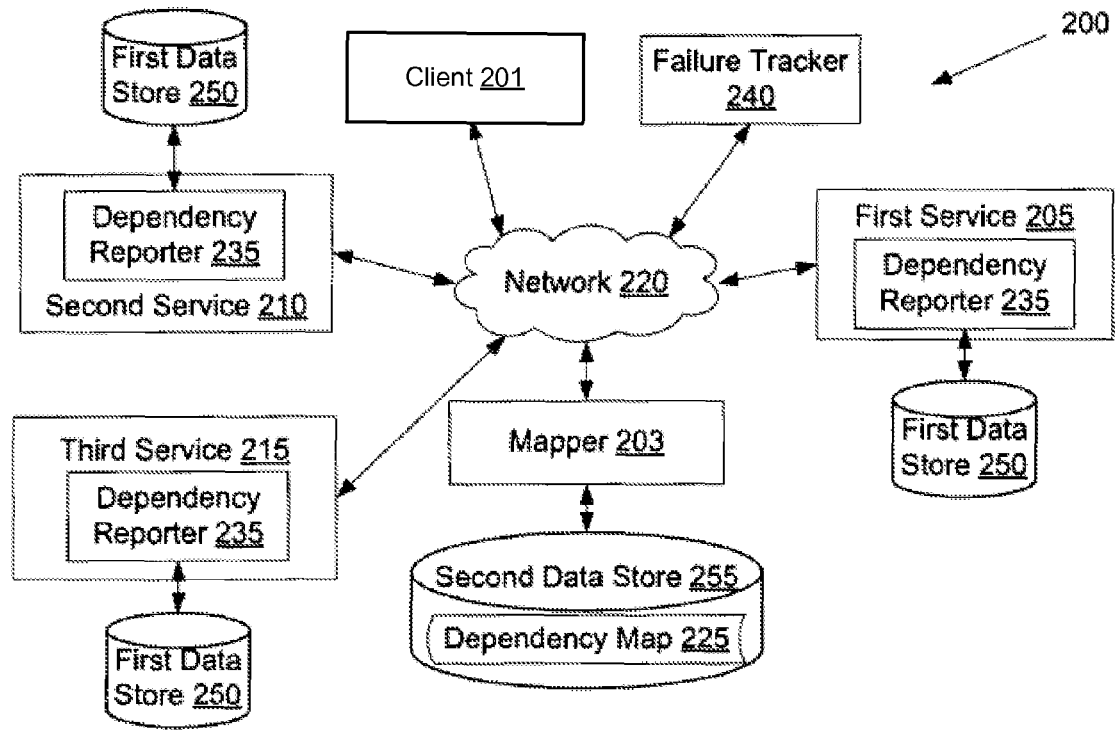

| Dependent Service | | | Service Dependent Upon | | | Dependency Data | | |
|---|---|---|---|---|---|---|---|---|
| Service Name | Process ID | Component ID | Service Name | Process ID | Component ID | Rating | Total Calls | Frequency of Calls |
| Flight Booking | JVM1 | FB1 | Credit Card | JVM2 | CC1 | 1 | 1000 | 20/day |
| Flight Booking | JVM1 | FB1 | Data Store | JVM3 | DS1 | 1 | 1000 | 20/day |
| Travel Agent | JVM1 | TA1 | Flight Booking | JVM1 | FB1 | 0.8 | 600 | 10/day |
| Travel Agent | JVM1 | TA1 | Hotel Booking | JVM1 | HB1 | 0.7 | 500 | 8/day |
| Hotel Booking | JVM1 | HB1 | Credit Card | JVM2 | CC1 | 1 | 1000 | 20/day |
| Hotel Booking | JVM1 | HB1 | Data Store | JVM3 | DS1 | 1 | 1000 | 20/day |
| Credit Card | JVM2 | CC1 | Data Store | JVM3 | DS1 | 1 | 2000 | 40/day |

DEPENDENCY MANAGEMENT WITH ATOMIC DECAY

TECHNICAL FIELD

Embodiments of the present invention relate to distributed systems, and more specifically to monitoring dependencies in a distributed system.

BACKGROUND

Distributed computing systems include multiple distinct services. Each service may be independent of other services, and may be accessed without knowledge of its underlying platform implementation. Commonly, services invoke other distinct services during processing. For example, a travel agent service may invoke a flight booking service and a hotel booking service. In turn, the flight booking service and hotel booking service may each invoke a credit card service.

In conventional distributed computing systems, it can be difficult to know what services depend on other services. Even where it is known that a service depends on another service, conventional distributed computing systems do not have mechanisms for determining a degree for such a dependency.

FIG. 1A illustrates a conventional distributed computing system 100 that includes a first service 105 at a first location 120, and a second service 110 and a third service 115 at a second location 130. The first location 120 and second location 130 are connected via a network 125. First service 105 depends on second service 110, which in turn depends on third service 115. Since first service 105 is at a different location from second service 110, lag may be introduced whenever first service 105 invokes second service 110. To reduce this lag, the second service 110 may be migrated from the second location 130 to the first location 120.

FIG. 1B illustrates another conventional distributed computing system 150 showing the distributed computing system of FIG. 1A after the second service 110 has been migrated. Since the second service 116 is now at the first location 120 along with the first service 105, first service 105 can invoke second service 110 without lag. However, second service 110 depends on third service 115. Therefore, first service 105 still encounters a similar lag as it did prior to the migration, since a lag is introduced when second service 110 invokes third service 115. However, the dependency between the second service 110 and the third service 115 may not be apparent in the conventional computing system 150.

BRIEF DESCRIPTION OF THE DRAWINGS

The present invention is illustrated by way of example, and not by way of limitation, in the figures of the accompanying drawings and in which:

FIG. 2 illustrates an exemplary distributed computing system, in which embodiments of the present invention may operate;

FIG. 3 illustrates an exemplary dependency map, in accordance with one embodiment of the present invention;

DETAILED DESCRIPTION

Figure 1A:
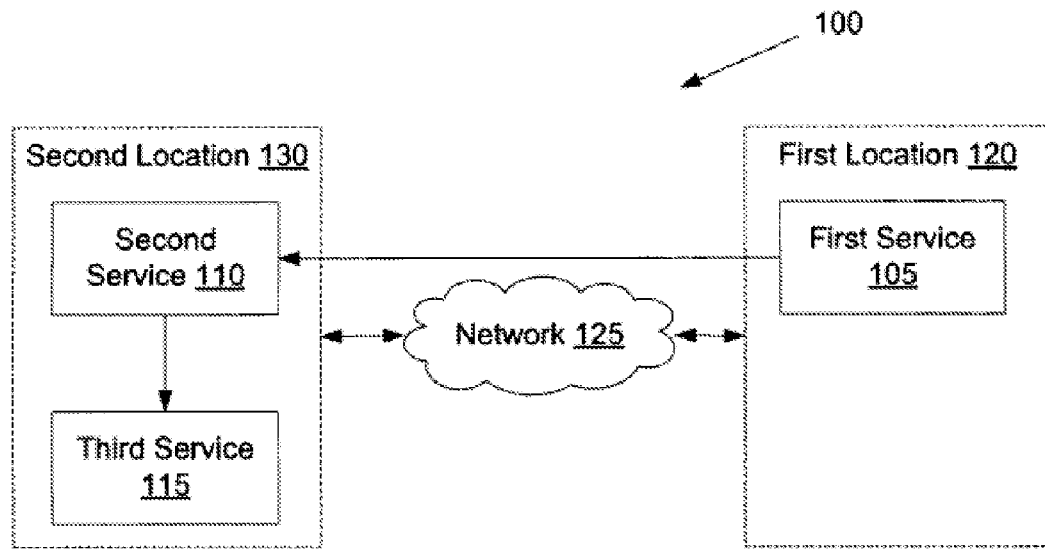
FIG. 1A illustrates a conventional distributed computing system before a service has been migrated.
Figure 1B:
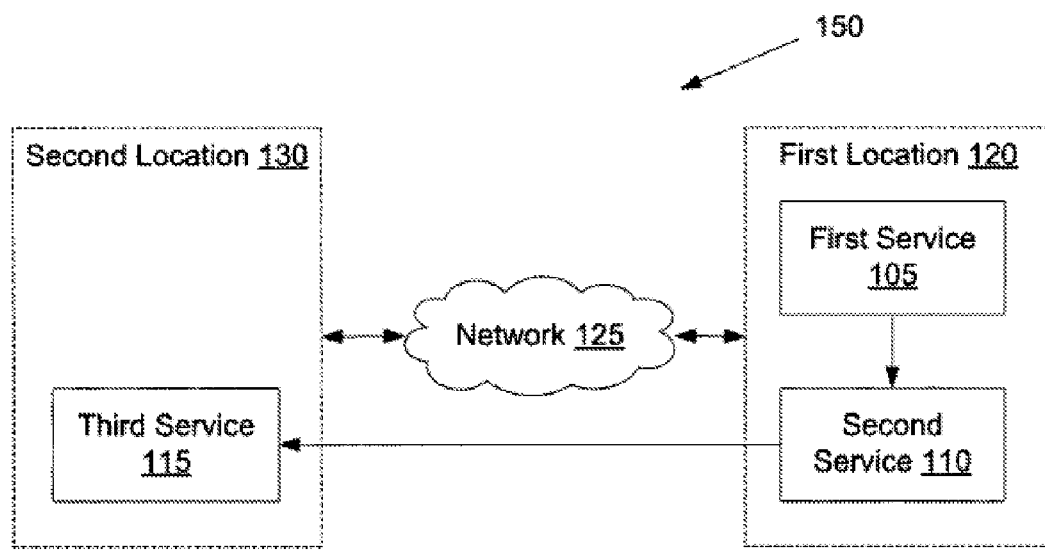
FIG. 1B illustrates a conventional distributed computing system after a service has been migrated.

Described herein is a method and apparatus for monitoring dependencies in a distributed computing system. In one embodiment, a dependency is identified between a first component of a distributed computing system and a second component of the distributed computing system if the first component invokes the second component. A dependency reporter at the first service and/or the second service may identify when the first service invokes the second service. A dependency map of the distributed computing system that includes the dependency between the first component and the second component is built. The dependency map may be built from a collection of flat files, a dependency database, and/or invocation reports.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "building", "applying", "determining", "migrating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 2 illustrates an exemplary distributed computing system 200, in which embodiments of the present invention may operate. In one embodiment, the distributed computing system 200 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 200 may include clients (e.g., client 201) and services (e.g., first service 205, second service 210 and third service 215), connected via a network 220. The network 220 may be a public network (e.g., Internet), a private network (e.g., Ethernet or a local area Network (LAN)), or a combination thereof. In one embodiment, the network 220 includes an enterprise service bus (ESB). An ESB is an event-driven and standards-based messaging engine that provides services for more complex architectures. The ESB provides an infrastructure that links together services 205, 210, 215 and clients 201 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Client 201 may be, for example, a personal computer (PC), palm-sized computing device, personal digital assistant (PDA), etc. Client 201 may also be an application run on a PC, server, database, etc. In an SOA, client 201 includes an application that accesses services 205, 210, 215. Client 201 may be a fat client (client that performs local processing and data storage), thin client (client that performs minimal or no local processing and minimal to no data storage), or a hybrid client (client that performs local processing but little to no data storage).

Services 205, 210, 215 may be discretely defined sets of contiguous and autonomous functionality (e.g., business functionality, technical functionality, etc.). Services 205, 210, 215 may be resident on personal computers (PC), servers, routers, etc. Each service 205, 210, 215 may represent a process, activity or other resource that can be accessed and used by other services or clients on network 220. Each service 205, 210, 215 may be independent of other services, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

Services 205, 210, 215 may be implemented using an object oriented programming (OOP) environment. In object oriented programming, a class represents an abstract data structure that provides a blueprint that specifies behaviors (methods) and state variables (fields). An object is an instance of a class that can be created (instantiated) by assigning values to the state variables. Each object can be viewed as an independent machine or actor with a distinct role or responsibility. In one embodiment, some services 205, 210, 215 are objects. Alternatively, services 205, 210, 215 may include multiple objects. Each object may include a method or methods, each of which performs a specific task or tasks for the object.

Services 205, 210, 215 may also be implemented using procedural programming, functional programming, or other programming methodologies. Such services 205, 210, 215 may be and/or include functions, procedures, or other programming constructs.

In one embodiment, each of the services 205, 210, 215 includes a dependency reporter 235. In one embodiment, in which the services are programmed using aspect oriented programming (AOP), the dependency reporter 235 includes an interceptor. An interceptor is logic that is triggered by a certain event or events, that can be inserted between a method invoker and a method (e.g., between a first service that invokes a second service) without modifying code of either. It should be noted that AOP is not mutually exclusive with other programming environments (e.g., OOP, procedural programming, etc.), and that AOP can be used in conjunction with such programming environments. In other embodiments, the dependency reporter 235 may be logic that is incorporated into the services 205, 210, 215 by modifying code of the services. Alternatively, the dependency reporter 235 may be a program (e.g., an object, procedure, etc.) coupled to a service that tracks when the service is called by, or makes calls to, other services.

When the dependency reporter 235 detects that a service calls (invokes) another service, or is called by another service, it logs the identities of the service being called and the service making the call. The identity of a service may include, for example, a process identifier (e.g., a unique java virtual machine (JVM) in Java, or a unique Unix process in C++ on Unix) of the service or of a process on which the service is running. The identity may also include an identification of an object, procedure, function, etc. running within a process. The identity may further include specific components of an object, procedure, function, etc. For example, in services constructed using OOP, the identity may include an object and/or a method within the object.

In one embodiment, the dependency reporter 235 is coupled with a first data store 250. The first data store 250 may be a database, file system, or other data arrangement on a volatile storage (e.g., random access memory (RAM), Flash, etc.) and/or a nonvolatile storage (e.g., hard disk drive, nonvolatile RAM (NVRAM), etc.). The first data store 250 may be local to a machine on which the dependency reporter 235 runs. Alternatively, the first data store 250 may be external to the machine on which the dependency reporter 235 runs, and connected with the machine directly or via network 220. In one embodiment, the first data store 250 connects with multiple machines, each of which runs a distinct service or services (e.g., first service 205, second service 210, and third service 215). For example, first data store 250 may be a dependency database or a file system on which all dependency reporters 235 may store invocation logs (not shown). Preferably, each of the invocation logs shares a file format, so that they can all be easily accessed by services of the distributed computing system 200. In another example, multiple dependency reporters 235 write to a shared invocation log on a shared first data store 250.

In one embodiment, the dependency reporter 235 transmits detected invocations to a mapper 203. Mapper 203 is a service that maintains a dependency map 225 of the distributed computing system 200. In one embodiment, mapper 203 maintains the dependency map in a second data store 255, which may be internal or external to a machine on which mapper 203 runs. Mapper 203 uses the invocation logs (e.g., one or more flat files), received invocation reports, and/or a dependency database to build the dependency map 225. In one embodiment, mapper 203 retrieves invocation logs from one or more locations (e.g., first data stores 250). In another embodiment, mapper 203 retrieves invocation information from a dependency database. In yet another embodiment, mapper 203 receives invocation reports from services. Mapper 203 may also obtain invocation information from multiple sources (e.g., some services may send invocation reports to mapper 203, other services may store invocation logs locally in first data stores 250, and still other services may store invocation information in a dependency database).

Each invocation/call detected by a dependency reporter 235 represents a dependency, in which the service making the call is dependent upon the service being called. These dependencies are tracked by mapper 203 by keeping an up-to-date dependency map 225. Mapper 203 can also track dependencies between specific components within services. For example, mapper 203 may track the dependency between a first service and a specific method or object within a second service. Mapper 203 adds a new dependency to, or updates an existing dependency on, the dependency map 225 each time a service is detected to invoke another service (or a specific method or object within another service). If it is the first time that the invoking service has called the invoked service, a new dependency is added. Otherwise, an existing dependency is updated.

In one embodiment, mapper 203 imposes an administrative view on the dependency map 225. The administrative view allows the services to be represented on the dependency map 225 using human understandable service names, service types, and/or service descriptions. The administrative view may be imposed by determining a service type for each service, and applying a human understandable service name based on the service type. The service type and/or service name may be determined by querying the service and/or by querying a service registry on the distributed computing system 200. Alternatively, service types and/or service names may be input by a user of the mapper 203. Imposing an administrative view may also include adding a service description to the services. As with the service name and service type, the service description may be determined by querying a service or service registry and/or based on input received from a user.

In one embodiment, mapper 203 associates dependency statistics to each dependency. The dependency statistics may include, for example, a number of times a service has been invoked by another service, the frequency of calls between two services, the most recent call, and so on. Dependency statistics may be valuable in determining a degree of dependency between services.

In one embodiment, mapper 203 assigns a dependency rating to each dependency. The dependency rating represents a heuristic for the degree to which one service is dependent upon another service. In one embodiment, the dependency rating is dependent upon a total number of calls. For example, the more times a service calls another service, the greater the calling service depends on the called service. In another embodiment, the dependency rating is dependent upon the frequency of calls. In yet another embodiment, the dependency rating is dependent upon an elapsed time since a most recent call.

In a further embodiment, mapper 203 assigns an atomic decay factor having a specified half life to the dependency rating. The atomic decay factor reduces the dependency rating over time according to the specified half life. For example, if a dependency has an atomic decay factor with a half life of one week, then the dependency rating is cut in half after one week. Different atomic decay factors may be applied to different dependencies. For example, any dependency including services dealing with exchange of money may be assigned a first atomic decay factor, while any dependency including services dealing with the storage of information may be assigned a second atomic decay factor. If an atomic decay factor is used, the dependency rating may be increased or reset each time a new call is detected. For example, if the dependency rating starts at 1.0, it may be rest to 1.0 each time the dependent service is detected to invoke the service that it is dependent upon. In another example, each time a call is detected, a specified value (e.g., 0.1) may be added to the dependency rating.

It can be beneficial to track dependencies between services to gain an understanding of the needs of individual clients and services within the distributed computing system 200. The dependency map 225 may be used, for example, to intelligently migrate services between locations within the distributed computing system 200, or to track most likely points of failure within the distributed computing system 200.

Figure 10:
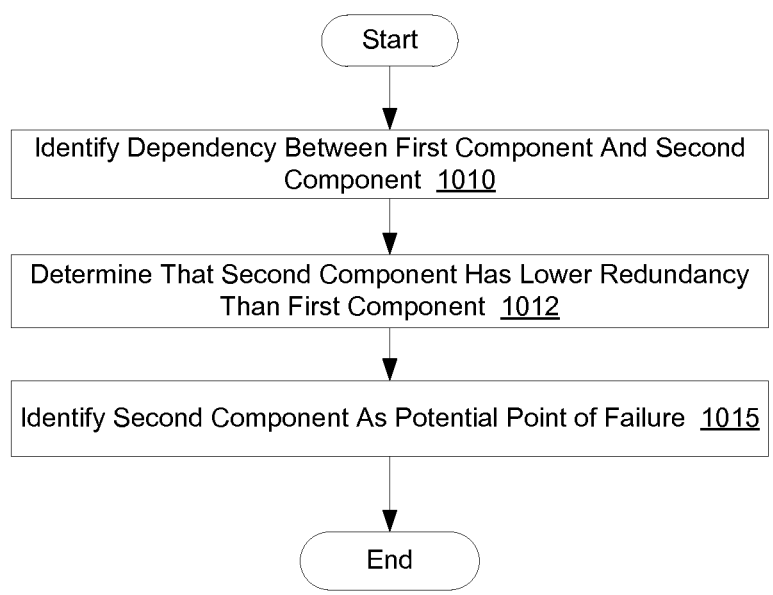
FIG. 10 illustrates a flow diagram of one embodiment for a method of identifying a potential point of failure.

In one embodiment, the distributed computing system 200 includes a failure tracker 240. The failure tracker 240 may use the dependency map 225 to determine most likely points of failure within the distributed computing system 200. For example, the first service 205 may be implemented on clustered or redundant servers so that even if an instance of the first service 205 fails, the service remains available. However, first service 205 may strongly depend on second service 210. Therefore, if second service 210 fails, first service 205, though technically operable, will be unable to perform certain functions. Failure tracker 240 notes the dependencies between services (e.g., first service 205 and second service 210), and identifies whether services on which other services depend have a lower level of redundancy than the dependent services. Therefore, in the example provided, failure tracker could alert first service 205 (or an administrator of first service 205) that second service 210 lacks redundancy. In an example, FIG. 10 shows a dependency being identified between a first component and a second component (block 1010), a determination being made that the second component has a lower redundancy than the first component (block 1012), and an identification being made that the second component is a potential point of failure. Redundancy may then be added to second service 210 to improve availability of the first service 205. Failure tracker 240 may also track the number of times that a service is unable to perform its functions because a service on which it depends is unavailable. This information can also be used by an administrator to increase availability and/or redundancy of services.

FIG. 3 illustrates an exemplary dependency map 300, in accordance with one embodiment of the present invention. The dependency map 300 is represented as a table that includes multiple dependencies between a flight booking service, a travel agent service, a hotel booking service, and a credit card service. Each entry in the table represents a single dependency, and includes a process ID and a component ID for both the dependent service, and the service that it is dependent upon. The process ID and component ID together uniquely identify a service. Each entry also includes a human readable service name for the dependent service and the service it is dependent upon that helps users understand what the services are. Each entry may also include service descriptions that provide further information on the services.

The exemplary dependency map 300 further includes additional dependency data such as dependency statistics (e.g., total number of calls, frequency of calls, most recent call, etc.) and a dependency rating. In one embodiment, an atomic decay factor having a specified half life is applied to one or more dependency rating. The atomic decay factor causes the dependency ratings to reduce in value as time passes.

Figure 4:
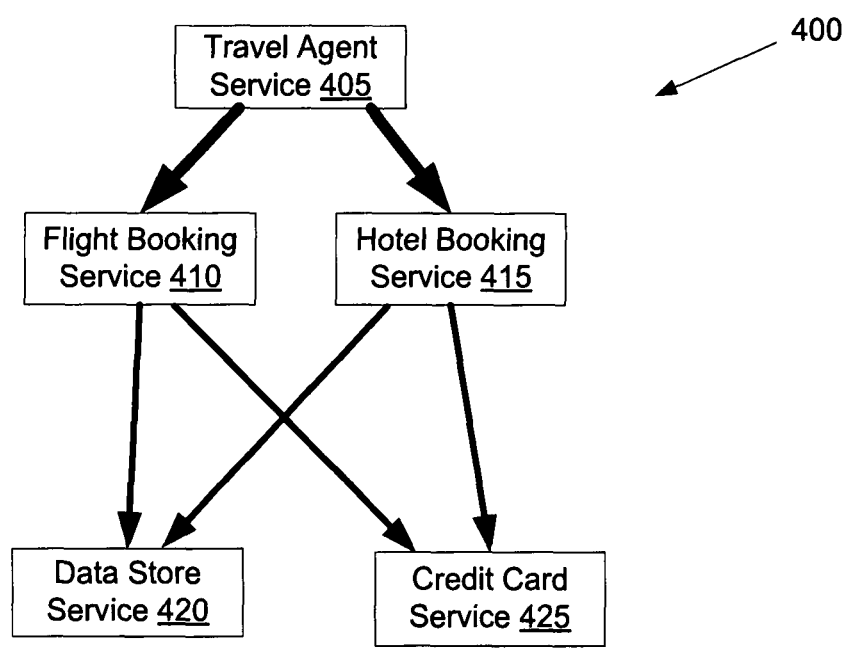
FIG. 4 illustrates an exemplary dependency map, in accordance with another embodiment of the present invention.

FIG. 4 illustrates an exemplary dependency map 400, in accordance with another embodiment of the present invention. The dependency map 400 graphically illustrates dependencies, in which each arrow represents a dependency. For example, travel agent service 405 is dependent upon flight booking service 410 and hotel booking service 415. In turn, both flight booking service 410 and hotel booking service 415 are dependent upon data store service 420 and credit card service 425. In one embodiment, a degree of dependency is illustrated by the thickness of the arrows, such that thicker arrows represent stronger dependencies. Alternatively, the degree of dependency between services may be represented by numerical dependency ratings or other graphical or textual representations of a dependency rating.

Figure 5A:
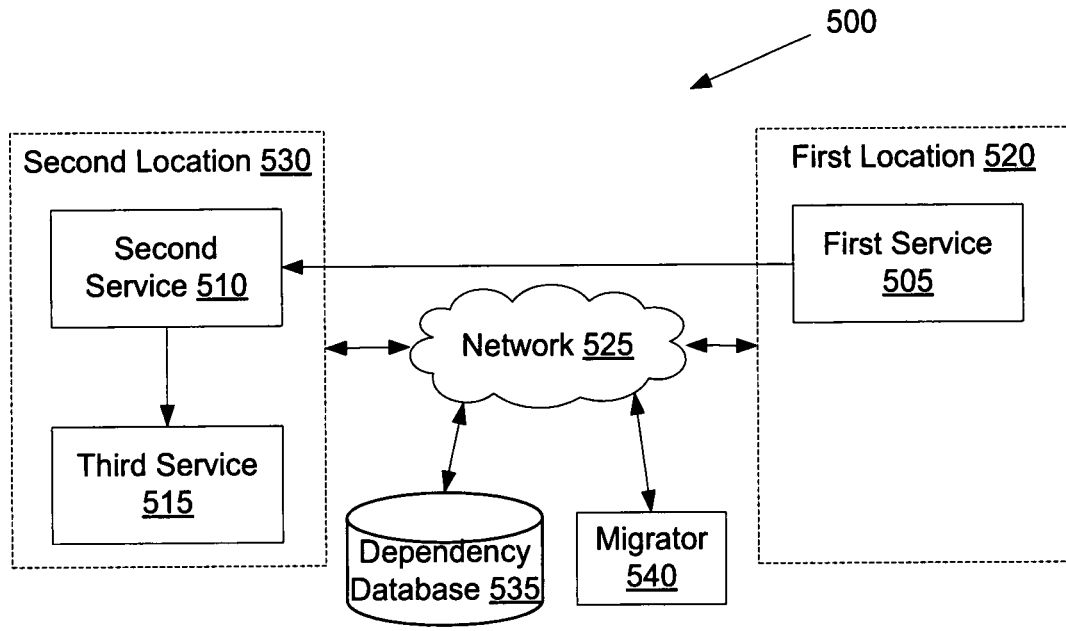
FIG. 5A illustrates a distributed computing system, in accordance with one embodiment of the present invention.

FIG. 5A illustrates a distributed computing system 500, in accordance with one embodiment of the present invention. The distributed computing system 500 includes a first service 505 at a first location 520, and a second service 510 and a third service 515 at a second location 530. Each of the first location 520 and second location 530 may represent a machine on which services are located and/or a graphical location (e.g., Los Angeles, London, etc.) at which a machine is located. The first location 520 and second location 530 are connected via a network 525. First service 505 depends on second service 510, which in turn depends on third service 515. Since first service 505 is at a different location from second service 510, lag may be introduced whenever first service 505 invokes second service 510.

In one embodiment, the distributed computing system 500 includes a dependency database 535 and a migrator 540. The dependency database 535 includes invocation information that has been stored by one or more of the first service 505, second service 510 and third service 515. Each entry in the dependency database 535 may represent a single invocation of one service by another service. For example, a first entry may have been added to the dependency database 535 when first service 505 invoked second service 510, and a second entry may have been added when the second service 510 invoked third service 515.

In one embodiment, migrator 540 is a service of the distributed computing system 500 that migrates services between locations (e.g., from a first machine to a second machine). When a service is to be migrated, the code and data that makes up the service is packaged. Packaging may include placing the code and data into a single file or folder, compressing the code and data, etc. The package is then uploaded to and installed at the new location (e.g., on the new machine).

Migrator 540 in one embodiment, uses dependency data from the dependency database 535 to generate a dependency map. Alternatively, migrator 540 may generate a dependency map from an invocation log or a collection of invocation logs. To generate the dependency map, migrator 540 notes each instance in which the service to be migrated invoked another service. Migrator 540 adds a dependency to the dependency map for each service that the service to be migrated has invoked in its history. Migrator 540 then determines dependencies of the services that the service to be migrated is dependent upon. Migrator 540 repeats this process for each identified service until no further dependencies are discovered.

Migrator 540 applies a dependency rating to each dependency in the dependency map. Initially, each dependency may be assigned a maximum dependency rating (e.g., 1.0). A most recent invocation associated with each dependency may then be determined, and an atomic decay factor applied to the dependency rating based on the amount of elapsed time since the most recent invocation was detected. This results in older dependencies (in which a service have not recently been invoked by the dependent service) having lower dependency ratings than newer dependencies (in which a service has recently been invoked by the dependent service).

In another embodiment, migrator 540 requests a dependency map from a mapper (e.g., mapper 203 of FIG. 2). The dependency map may include dependency ratings, invocation statistics, and other useful information.

Migrator 540 compares the dependencies in the dependency map (whether requested from a mapper or generated by migrator 540) to a dependency rating threshold. Services associated with those dependencies having a dependency rating higher than the threshold are marked for migration. Those services associated with dependencies having a dependency rating lower than or equal to the dependency rating threshold are not marked for migration. All services marked for migration may then be packaged and migrated. Therefore, migrator 540 can intelligently migrate services based on dependencies.

In one embodiment, migrator 540 determines all services that depend on services that are marked for migration. If migrator 540 generated the dependency map, migrator 540 adds additional dependencies to the dependency map for each such detected dependency. Migrator 540 then assigns a dependency rating (e.g., using the atomic decay factor) to each newly added dependency. If migrator 540 did not generate the dependency map, then dependencies between services marked for migration and services that depend on such marked services can be determined by examining the dependency map.

For each considered service that is marked for migration, migrator 540 compares dependency ratings between a dependent service marked for migration and another dependent service not marked for migration. If the dependent service not marked for migration depends more heavily on the considered service than the dependent service marked for migration, the mark for migration is removed from the considered service. Thus, services can remain or move with those other services that most strongly depend on them.

Figure 5B:
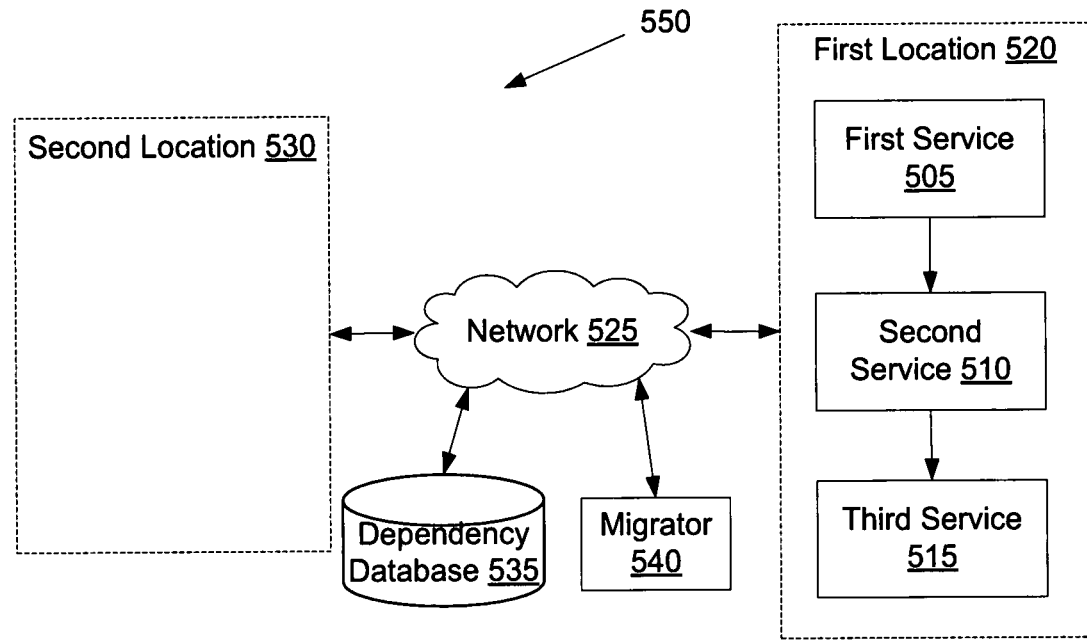
FIG. 5B illustrates a distributed computing system, in accordance with another embodiment of the present invention.

FIG. 5B illustrates a distributed computing system 550, in accordance with yet another embodiment of the present invention. Distributed computing system 550 illustrates distributed computing system 500 of FIG. 5A after the second service 510 has been migrated. As illustrated, since second service 510 is dependent upon third service 515, third service 515 was also migrated. Since both the second service 510 and third service 515 have been migrated, there will be little to no lag when first service 505 invokes second service 510, or when second service 510 invokes third service 515.

Figure 6:
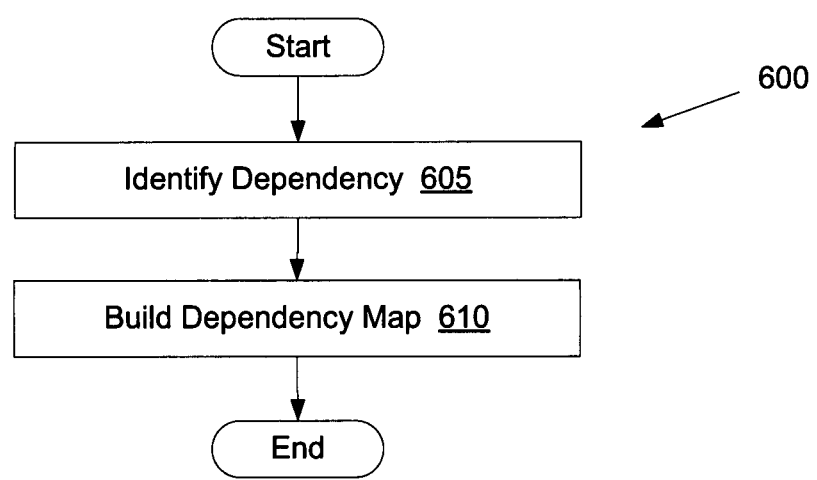
FIG. 6 illustrates a flow diagram of one embodiment for a method of managing dependencies in a distributed computing system.

FIG. 6 illustrates a flow diagram of one embodiment for a method 600 of managing dependencies in a distributed computing system. The method is performed by processing logic that comprises hardware (e.g., circuitry, dedicated logic, programmable logic, microcode, etc.), software (such as instructions run on a processing device), or a combination thereof. In one embodiment, method 600 is performed by services 205, 210, 215 and/or mapper 203 of distributed computing system 200 of FIG. 2.

Referring to FIG. 6, method 600 includes identifying a dependency (block 605). The dependency may be a dependency between services and/or between components of services. Identifying the dependency may include identifying process IDs of the services or of processes on which the services run, identifying components of the services (e.g., objects, procedures, functions, etc.), and/or identifying methods within the components. The dependency may be identified by detecting an invocation of one service by another service.

At block 610, a dependency map is built that includes the dependency. The dependency map may be built by compiling invocation data from invocation reports, invocation logs, a dependency database, or other sources. Each article of invocation data identifies an instance of one service invoking another service. Building the dependency map may include adding invocation statistics to the dependencies and/or adding a dependency rating to the dependencies. Building the dependency map may also include assigning a human readable service name to each service. The dependency map can be displayed graphically, via a table, via a tree, etc.

Figure 7:
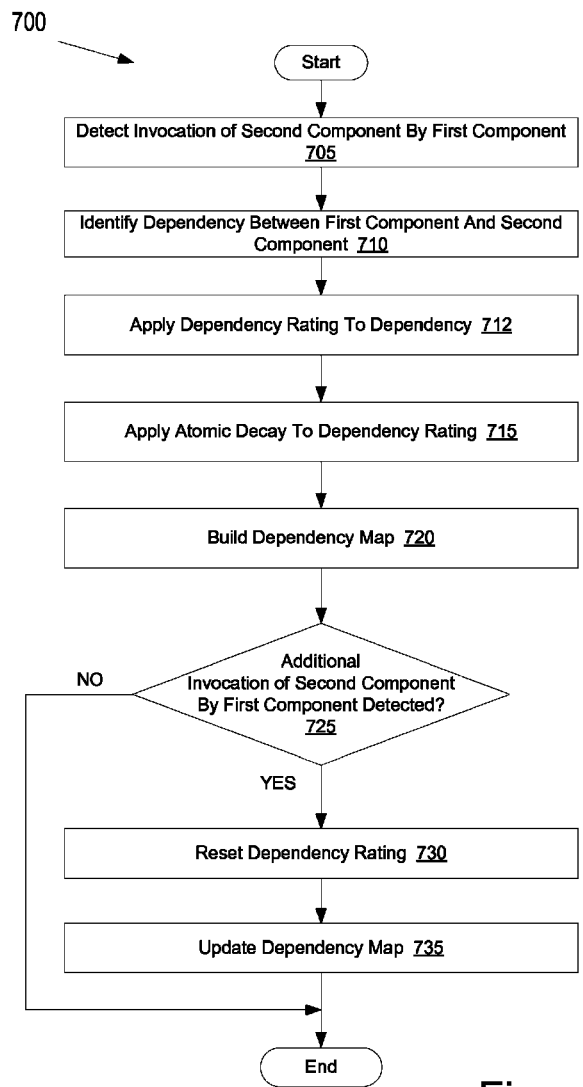
FIG. 7 illustrates a flow diagram of another embodiment for a method of managing dependencies in a distributed computing system.

FIG. 7 illustrates a flow diagram of another embodiment for a method 700 of managing dependencies. The method is performed by processing logic that comprises hardware (e.g., circuitry, dedicated logic, programmable logic, microcode, etc.), software (such as instructions run on a processing device), or a combination thereof. In one embodiment, method 600 is performed by services 205, 210, 215 and/or mapper 203 of distributed computing system 200 of FIG. 2.

Referring to FIG. 7, method 700 includes detecting an invocation of a second component by a first component at block 705. The invocation may be detected by a dependency reporter of the first service and/or a dependency reporter of the second service. The invocation may be recorded in an invocation log, stored in a dependency database and/or reported to a mapper.

At block 710, a dependency is identified between the first component and the second component based on the detected invocation. The first component and second component may be services, or components of services in a distributed computing system. The dependency may be identified by a mapper, or by a service of a distributed computing system.

At block 712, a dependency rating is applied to the dependency. The dependency rating is a heuristic that identifies a degree to which one component depends on another component. The dependency rating may be based on a total number of invocations, elapsed time since a most recent invocation, frequency of invocations, and/or other invocation statistics. At block 715, an atomic decay factor having a specified half life is applied to the dependency rating. The atomic decay factor reduces the dependency rating over time based on the half life.

At block 720, a dependency map is built that includes the dependency and the dependency rating. The dependency map may also include dependencies from other invocations between other components, each of which may also include a dependency rating.

At block 725, processing logic determines whether an additional invocation of the second component by the first component has been detected. If a second invocation has been detected, the method proceeds to block 730. If a second invocation is not detected, the method ends.

At block 730, the dependency rating is reset. The value to which the dependency rating is reset may be a value that was initially assigned to the dependency rating prior to applying the atomic decay factor. Alternatively, rather than resetting the dependency rating, a fixed value may be added to the dependency rating. At block 735, the dependency map is updated to reflect the changed dependency rating. The method then ends.

Figure 8:
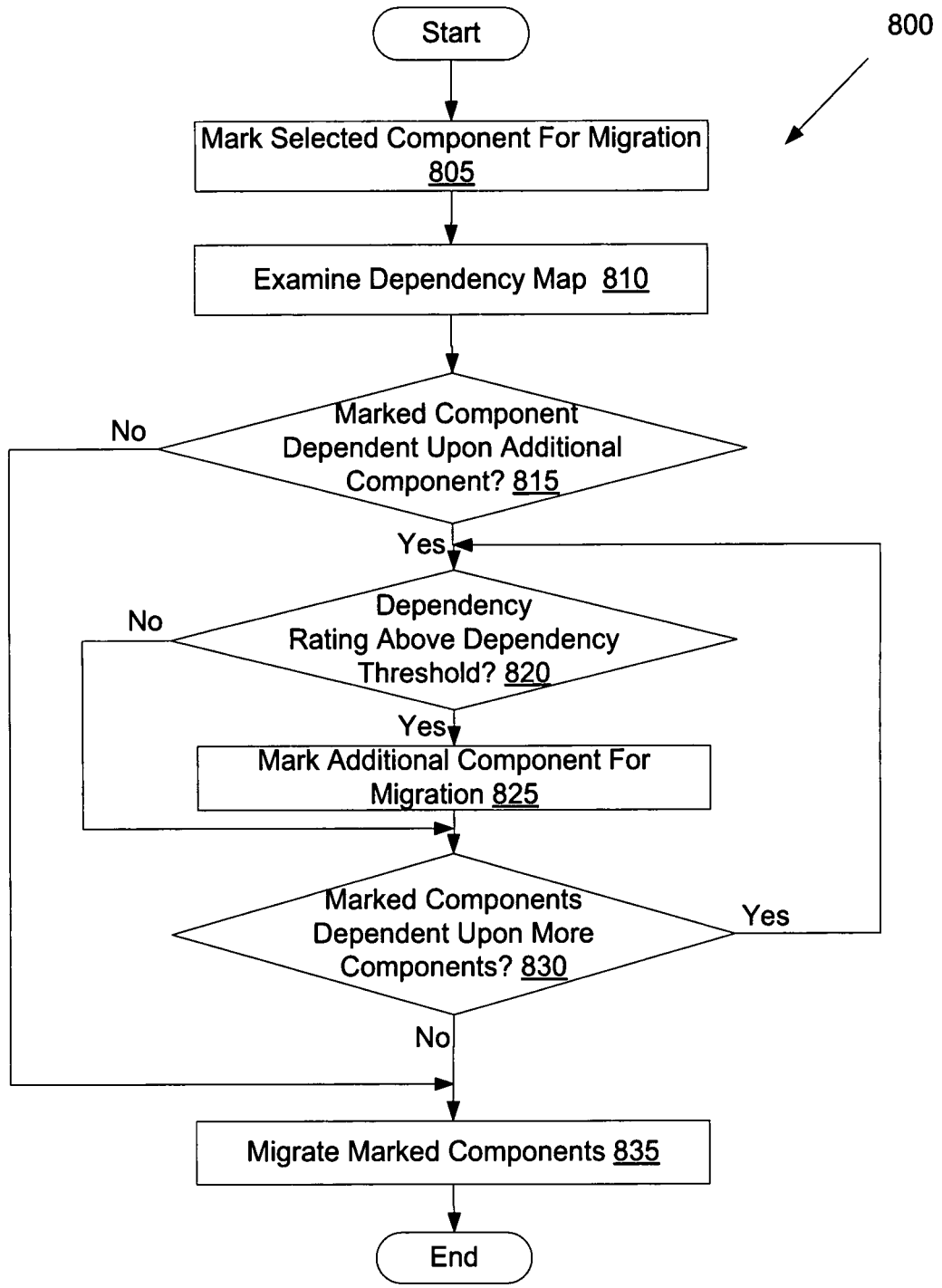
FIG. 8 illustrates a flow diagram of one embodiment for a method of migrating components within a distributed computing system.

FIG. 8 illustrates a flow diagram of one embodiment for a method 800 of migrating components (e.g., services) within a distributed computing system. The method is performed by processing logic that comprises hardware (e.g., circuitry, dedicated logic, programmable logic, microcode, etc.), software (such as instructions run on a processing device), or a combination thereof. In one embodiment, method 800 is performed by migrator 540 of FIG. 5A.

Referring to FIG. 8, method 800 begins with marking a selected component for migration (block 805). The component may be a service or component of a service, and may be selected for migration by a client and/or an administrator of the component.

At block 810, a dependency map is examined to determine whether the marked component is dependent on any other components, and whether those components in turn are dependent on still other components. At block 815, processing logic determines whether the marked component is dependent upon an additional component or additional components. If the marked component is dependent upon an additional component, the method proceeds to block 820. If the marked component is not dependent upon an additional component, the method proceeds to block 835.

Each dependency between components is associated with a dependency rating. At block 820, processing logic compares a dependency rating associated with the dependency between the component and the additional component to a dependency threshold. If the dependency rating is higher than the dependency threshold, the method continues to block 825, and the additional component is marked for migration. If the dependency rating is not higher than the dependency threshold, the method proceeds to block 830.

At block 830, processing logic determines whether there are any more components on which the marked components depend. If there are more components on which the marked components depend, the method proceeds to block 820. If there are no more components on which the marked components depend, the method continues to block 835.

At block 835, the marked components are migrated from one or more initial locations to a new location. Migrating the components may include packaging the components, and transmitting the package or packages to the new location.

Figure 9:
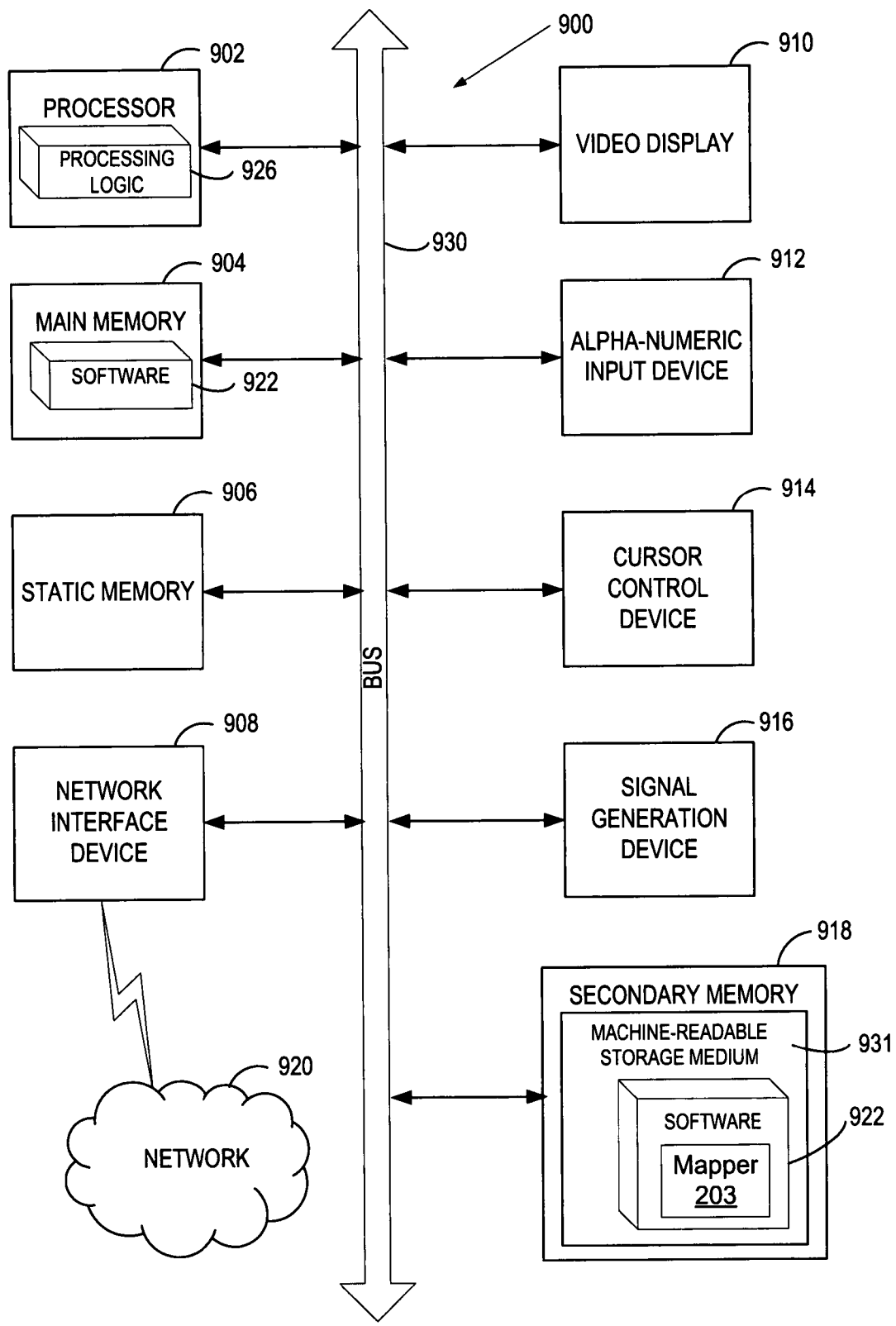
FIG. 9 illustrates a block diagram of an exemplary computer system, in accordance with one embodiment of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

The machine-readable storage medium 931 may also be used to store a dependency reporter 235 and/or mapper 203 of FIG. 2), and/or a software library containing methods that call a dependency reporter 235 or mapper 203. While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
storing invocation records in a data store by a processor;
determining, by the processor, statistics regarding invocations of a second component of a distributed computing system by a first component of the distributed computing system based on the invocation records;
determining, by the processor, a dependency between the first component and the second component based on the statistics;
determining, by the processor, a dependency rating for the dependency based on the statistics, wherein the dependency rating identifies a degree of dependency between the first component of the distributed computing system and the second component of the distributed computing system;
applying an atomic decay to the dependency rating, wherein the atomic decay reduces a value of the dependency rating over time according to a first atomic decay factor if the dependency includes a first service and according to a second atomic decay factor if the dependency includes a second service;
migrating the first component from a first location to a second different location; and
responsive to determining that the dependency rating for the dependency exceeds a dependency threshold, migrating the second component to the second location.

2. The computer implemented method of claim 1, further comprising:
resetting the dependency rating each time the first component invokes the second component.

3. The method of claim 1, further comprising:
building a dependency map of the distributed computing system that includes the dependency between the first component and the second component, wherein the dependency map includes the dependency rating.

4. The method of claim 1, further comprising:
determining whether the second component has a lower level of redundancy than the first component;
identifying the second component as a potential point of failure if it has a lower level of redundancy than the first component; and
notifying at least one of the first component or an administrator of the first component that the second component is a potential point of failure.

5. The method of claim 1, wherein at least one of the first component or the second component has a unique identification, the method further comprising:
associating at least one of the first component or the second component with the first service or the second service based on the unique identification.

6. A computer readable storage medium including instructions that, when executed by a processor, cause the processor to perform operations comprising:
storing invocation records in a data store by the processor;
determining by the processor, statistics regarding invocations of a second component of a distributed computing system by a first component of the distributed computing system based on the invocation records;
determining, by the processor, a dependency between the first component and the second component based on the statistics;
determining, by the processor, a dependency rating for the dependency based on the statistics, wherein the dependency rating identifies a degree of dependency between the first component of the distributed computing system and the second component of the distributed computing system;
applying an atomic decay to the dependency rating, wherein the atomic decay reduces a value of the dependency rating over time according to a first atomic decay factor if the dependency includes a first service and according to a second atomic decay factor if the dependency includes a second service;
determining that the first component has been migrated or will be migrated from a first location to a second location; and
responsive to determining that the dependency rating for the dependency exceeds a dependency threshold, marking the second component for migration to the second location.

7. The computer readable storage medium of claim 6, the operations further comprising:
migrating the first component from the first location to the second location; and
migrating the second component to the second location.

8. The computer readable storage medium of claim 6, the operations further comprising:
resetting the dependency rating each time the first component invokes the second component.

9. The computer readable storage medium of claim 6, the operations further comprising:
building a dependency map of the distributed computing system that includes the dependency between the first component and the second component.

10. The computer readable storage medium of claim 6, the operations further comprising:
determining whether the second component has a lower level of redundancy than the first component;
identifying the second component as a potential point of failure if it has a lower level of redundancy than the first component; and
notifying at least one of the first component or an administrator of the first component that the second component is a potential point of failure.

11. The computer readable storage medium of claim 6, wherein at least one of the first component or the second component has a unique identification, the operations further comprising:
associating at least one of the first component or the second component with the first service or the second service based on the unique identification.

12. A computer readable storage medium including instructions that, when executed by a processor, cause the processor to perform operations comprising:
storing invocation records in a data store by the processor;
determining, by the processor, a dependency between a first component of a distributed computing system and a second component of the distributed computing system based on invocations of the second component by the first component in the invocation records, wherein the first component has a first unique identification and the second component has a second unique identification;
associating, by the processor, the first component with a first service using the first unique identification and the second component with a second service using the second unique identification;
building, by the processor, a dependency map of the distributed computing system that includes the dependency between the first service and the second service;
applying a dependency rating to the dependency in the dependency map, the dependency rating having an atomic decay with a specified atomic decay factor, wherein the atomic decay reduces a value of the dependency rating over time according to the specified atomic decay factor, and wherein the specified atomic decay factor has a first value if the dependency between the first service and the second service includes a first service type and a second value if the dependency between the first service and the second service includes a second service type;
migrating the first component from a first location to a second location; and
migrating the second component to the second location if the dependency rating has a value that is greater than a dependency threshold.

13. The computer readable storage medium of claim 12, the operations further comprising:
resetting the dependency rating each time the first component invokes the second component.

14. The computer readable storage medium of claim 12, the operations further comprising:

determining whether the second component has a lower level of redundancy than the first component;

identifying the second component as a potential point of failure if it has a lower level of redundancy than the first component; and notifying at least one of the first component or an administrator of the first component that the second component is a potential point of failure.

15. A computing device comprising:

a memory; and a processor, coupled to the memory, to:

store invocation records in a data store;

determine statistics regarding invocations of a second component of a distributed computing system by a first component of the distributed computing system based on the invocation records;

determine a dependency between the first component and the second component based on the statistics;

determine a dependency rating for the dependency based on the statistics, wherein the dependency rating identifies a degree of dependency between the first component of the distributed computing system and the second component of the distributed computing system;

apply an atomic decay to the dependency rating, wherein the atomic decay reduces a value of the dependency rating over time according to a first atomic decay factor if the dependency includes a first service and according to a second atomic decay factor if the dependency includes a second service;

migrate the first component from a first location to a second different location; and migrate the second component to the second location responsive to a determination that the dependency rating for the dependency exceeds a dependency threshold.

16. The computing device of claim 15, wherein the processor is further to:

reset the dependency rating each time the first component invokes the second component.

17. The computing device of claim 15, wherein the processor is further to:

determine whether the second component has a lower level of redundancy than the first component, identify the second component as a potential point of failure if it has a lower level of redundancy than the first component, and notify at least one of the first component or an administrator of the first component that the second component is a potential point of failure.

18. The computing device of claim 15, wherein at least one of the first component or the second component has a unique identification, and wherein the processor is further to:

associate at least one of the first component or the second component with the first service or the second service based on the unique identification.

\* \* \* \* \*